United States Patent
Liu et al.

(10) Patent No.: US 9,815,544 B2
(45) Date of Patent: Nov. 14, 2017

(54) MODULAR REPLACEABLE SLIP JOINT INTERCOSTAL

(71) Applicant: THE BOEING COMPANY, Chicago, IL (US)

(72) Inventors: Chunlei Liu, Chicago, IL (US); Jeff S. Siegmeth, Chicago, IL (US); Joshua P. Baker, Chicago, IL (US); William N. Borjeson, Chicago, IL (US); Marius Constantinescu, Chicago, IL (US)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 14/289,466

(22) Filed: May 28, 2014

(65) Prior Publication Data

US 2015/0344124 A1 Dec. 3, 2015

(51) Int. Cl.
*B64C 1/06* (2006.01)
*B64C 1/18* (2006.01)

(52) U.S. Cl.
CPC ..................................... *B64C 1/18* (2013.01)

(58) Field of Classification Search
CPC .... B64C 1/20; B64C 1/18; B64C 9/00; B64C 9/003
See application file for complete search history.

(56) References Cited

U.S. PATENT DOCUMENTS

| | | | | |
|---|---|---|---|---|
| 3,899,092 A | * | 8/1975 | Nordstrom | B60P 1/52 244/137.1 |
| 3,906,870 A | * | 9/1975 | Alberti | B64D 9/003 244/137.1 |
| 4,457,649 A | * | 7/1984 | Vogg | B64D 9/003 244/118.1 |
| 5,234,297 A | * | 8/1993 | Wieck | B64D 9/003 244/118.1 |
| 2014/0064827 A1 | * | 3/2014 | Korenromp | B64D 11/00 403/63 |

* cited by examiner

*Primary Examiner* — Philip J Bonzell
(74) *Attorney, Agent, or Firm* — Haynes and Boone, LLP

(57) ABSTRACT

Systems, methods, and apparatus for a modular replaceable slip joint intercostal are disclosed. In one or more embodiments, an intercostal apparatus for a vehicle comprises a body, where the body is greater in length than in width. In at least one embodiment, the intercostal apparatus further comprises at least one slip joint opening located proximate an end of the body to slidably receive a bushing and a fastener, where the bushing rigidly attaches to a top surface of a seat track by the fastener.

20 Claims, 7 Drawing Sheets

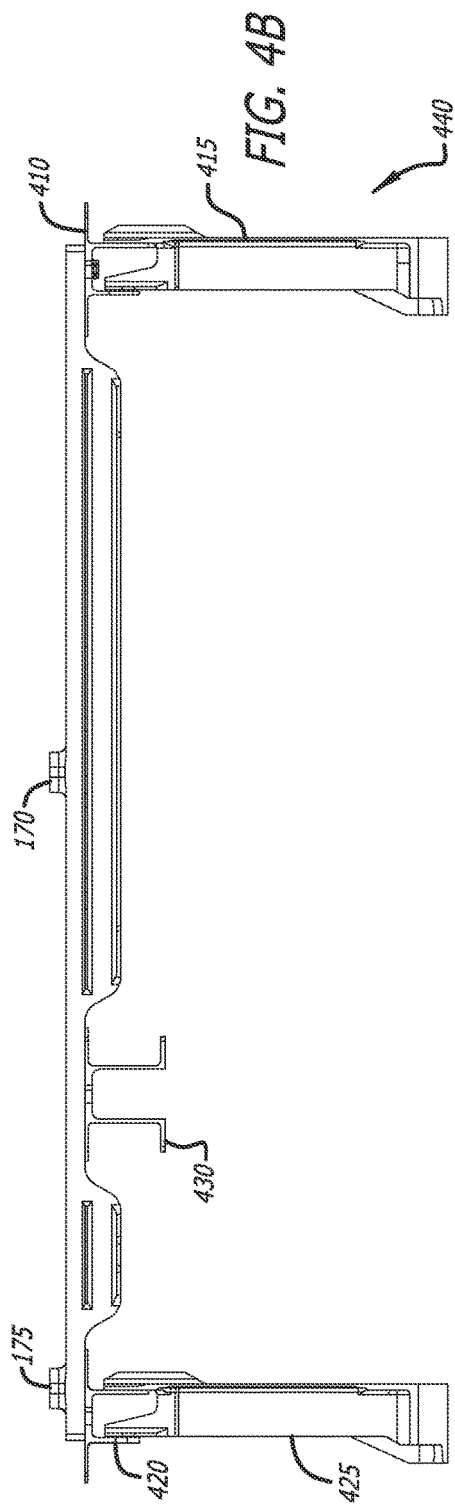
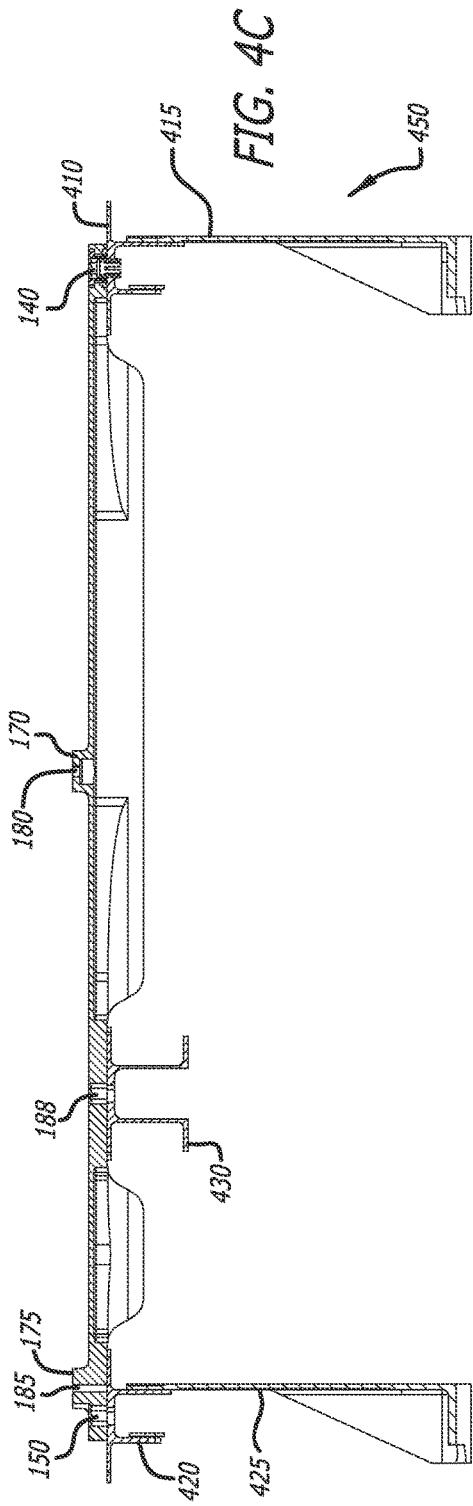

MODULAR REPLACEABLE SLIP JOINT INTERCOSTAL

FIELD

The present disclosure relates to intercostals. In particular, it relates to modular replaceable slip joint intercostals.

BACKGROUND

Currently, intercostals are routinely installed under the cabin floor of an aircraft. Intercostals are used to divert forces for the floor structure, to secure floor panels, as well as to provide attachment points for payloads (e.g., seats) and/or monuments (e.g., class dividing walls). Conventional intercostals typically employ rigid attachments. However, installation of conventional intercostals is not possible in the wing area of an aircraft fuselage or other areas of an aircraft that experience large amounts of deflection. This is because installation of conventional intercostals in such areas can cause less than optimal structural load paths and/or fatigue stress issues.

In addition, it should be noted that conventional intercostals are typically attached to longitudinal beams that lie under the cabin floor and run perpendicular to the floor panels. This configuration makes the intercostals difficult to install and remove because this area is small to work in and it is, in many cases, difficult or impossible to fit the necessary tools for installation/removal without temporarily removing local systems, adjacent floor panels, and structures mounted above the floor panels. As such, there is a need for an intercostal that can be installed in the wing area of an aircraft, and which may be easily installed and removed from that location.

SUMMARY

The present disclosure relates to a method, system, and apparatus for a modular replaceable slip joint intercostal. In one or more embodiments, an intercostal apparatus for a vehicle comprises a body, where the body is greater in length than in width. In at least one embodiment, the intercostal apparatus further comprises at least one slip joint opening located proximate a first end of the body to slidably receive a bushing and a first fastener, where the bushing rigidly attaches to a top surface of a first seat track by the first fastener.

In one or more embodiments, the intercostal apparatus further comprises at least one static opening located proximate a second end of the body, which is opposite the first end of the body, to receive a second fastener to rigidly attach the apparatus to a top surface of a second seat track, which is substantially parallel to the first seat track. In at least one embodiment, the body comprises at least one flange having a top surface and a bottom surface. The flange(s) extending substantially horizontally from a longitudinal side of the body such that a top surface of the flange(s) is substantially coplanar with the top surface of the first seat track and the top surface of the second seat track. The flange(s) comprises at least one opening to receive a floor panel connector.

In at least one embodiment, the apparatus further comprises at least one monument interface on a top surface of the body of the apparatus. In one or more embodiments, at least one monument interface is used to mount furniture, a class divider wall, a galley, and/or equipment. In some embodiments, at least one monument interface is a crown-type seat track mounting.

In one or more embodiments, the apparatus is installed in an over-wing area of the vehicle.

In at least one embodiment, a top surface of the body is multi-planar, such that a top surface of a center section of the body, located between the first end of the body and a second end of the body, is lower than a top surface of the first end of the body and a top surface of a second end of the body, which are substantially co-planar, and where the second end of the body is opposite the first end of the body. In some embodiments, the center section of the body is a single part, the first end of the body is a single part, and the second end of the body is a single part; and the center section, the first end, and the second end are mechanically fastened together to form the intercostal apparatus.

In one or more embodiments, at least a portion of the bushing is substantially cylindrical in shape. In at least one embodiment, a top edge of the bushing comprises a flange. In some embodiments, an underside of the flange of the bushing is in contact with an inner ledge of the slip joint(s), when the slip joint(s) receives the bushing. In one or more embodiments, the underside of the flange of the bushing is coated with a material to reduce friction. In some embodiments, the inner ledge of at least one slip joint is coated with a material to reduce friction.

In at least one embodiment, at least a portion of an exterior surface of the bushing is coated with a material (e.g., a polymer) to reduce friction. In some embodiments, at least a portion of an interior surface of at least one slip joint is coated with a material (e.g., a polymer) to reduce friction.

In one or more embodiments, a method for installing an intercostal in a vehicle, the method comprises providing, for at least one slip joint opening located proximate a first end of a body of the intercostal, a bushing and a first fastener. In at least one embodiment, an underside of a flange of the bushing is in contact with an inner ledge of at least one slip joint opening. The method further comprises rigidly attaching, by the first fastener, the bushing to a top surface of a first seat track.

In at least one embodiment, the method further comprises providing, for at least one static opening located proximate a second end of the body, a second fastener. In one or more embodiments, the first end of the body is opposite the second end of the body. The method further comprises rigidly attaching, by the second fastener, the intercostal to a top surface of a second seat track, which is substantially parallel to the first seat track.

In one or more embodiments, the method further comprises providing, for at least one opening of at least one flange extending substantially horizontally from a longitudinal side of the body such that a top surface of at least one flange is substantially coplanar with the top surface of the first seat track and the top surface of the second seat track, a floor panel connector. The method further comprises rigidly attaching, with the floor panel connector, the intercostal to a bottom surface of a floor panel.

In at least one embodiment, a system for an intercostal for a vehicle comprises at least one fastener, at least one bushing, and an intercostal. In one or more embodiments, the intercostal comprises a body, where the body is greater in length than in width. In one or more embodiments, the intercostal further comprises at least one slip joint opening located proximate an end of the body to slidably receive at least one bushing and at least one fastener, where at least one bushing rigidly attaches to a top surface of a seat track by at least one first fastener.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 4B is side view of the diagram of FIG. 4A, in accordance with at least one embodiment of the present disclosure.

FIG. 4C is cut-away view of the side view of FIG. 4B, in accordance with at least one embodiment of the present disclosure.

DESCRIPTION

Figure 1:
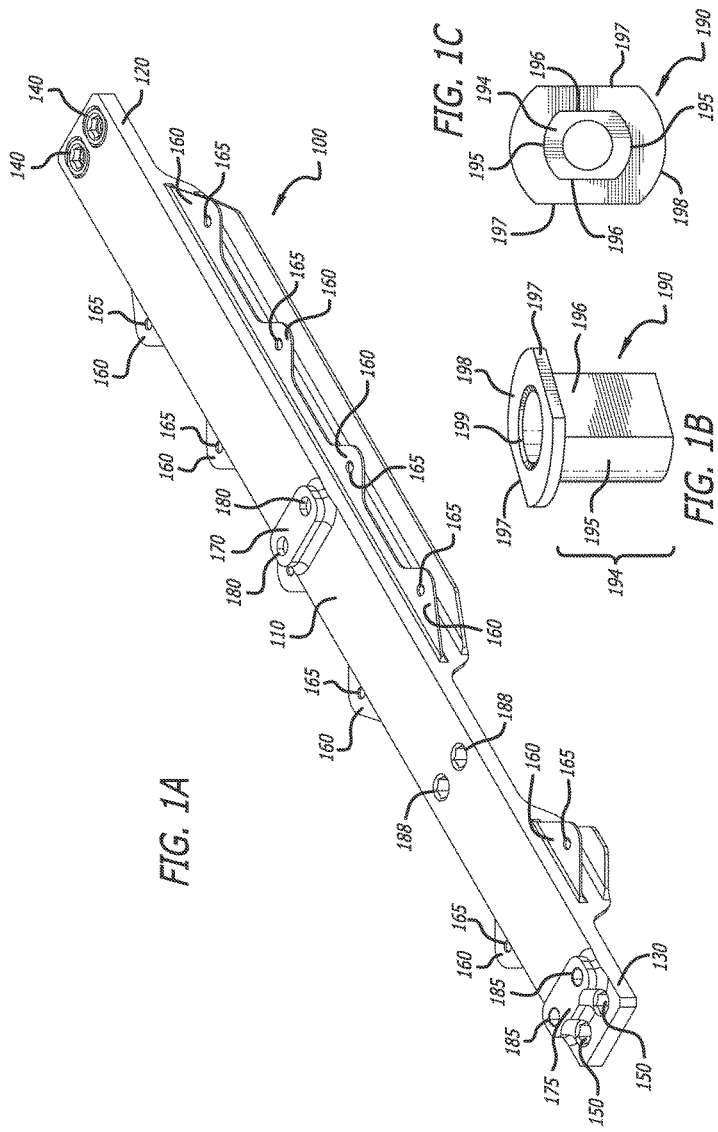
FIG. 1A is a diagram of a first embodiment of the disclosed modular replaceable slip joint intercostal, in accordance with at least one embodiment of the present disclosure.
FIG. 1B is a diagram of an exemplary bushing to be employed by the modular replaceable slip joint intercostal of FIG. 1, in accordance with at least one embodiment of the present disclosure.
FIG. 1C is a diagram showing the bottom view of the exemplary bushing of FIG. 1B, in accordance with at least one embodiment of the present disclosure.

The methods and apparatus disclosed herein provide an operative system for a modular replaceable slip joint intercostal. The disclosed system provides an intercostal design that employs at least one slip joint proximate an end of the intercostal. The slip joint(s) included in the intercostal allows for a reduction in fatigue problems.

As previously mentioned above, intercostals are currently routinely installed under the cabin floor of an aircraft. Intercostals are used to divert forces for the floor structure (e.g., floor beams and seat tracks), to secure floor panels, as well as to provide attachment points for payloads (e.g., seats, class dividing walls, galleys, and lavatories). Conventional intercostals may not be installed over the center wing box area of an aircraft due to fatigue stress problems associated with necessary flexing of the wing in this area.

The present disclosure provides a slip intercostal design with a unique slip joint that allows the intercostal to move in the axial direction to minimize constraint of the floor structure, which can lead to fatigue problems. The intercostal design additionally allows for the intercostal to be installed on top of an existing floor structure via a rigid fastener (e.g., an E-nut) fastened vertically downward.

In one or more embodiments, the intercostal design includes a drop-down mid-section such that the upper face of the intercostal is at the same level as the bottom surface of the floor. This feature allows for various well known interface mountings (e.g., a monument mounting, and a crown-type seat track mounting) to be incorporated onto the intercostal.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1A is a diagram of a first embodiment of the disclosed modular replaceable slip joint intercostal 100, in accordance with at least one embodiment of the present disclosure. In this figure, the intercostal 100 includes a body 110, a first end 120 of the body 110, and a second end 130 of the body 110. The second end 130 is located opposite the first end 120. The body 110 is shown to be greater in length than in width. Two slip joint openings (i.e. slip joints) 140 are shown to be located proximate the first end 120 of the body 110. The slip joint openings 140 are each able to slidably receive a bushing 190 (refer to FIG. 1B) and a fastener (not shown). It should be noted that the slip joint openings 140 each have a definite length such that if the airplane flexes a pre-defined amount, the intercostal 100 will reach the end of the slip joint opening 140 and take up the load. Also, it should be noted that the fastener is simply a hardware device (e.g., a bolt) that is able to mechanically join or affix two or more objects together. In addition, it should be noted that the interior surface of each of the slip joint openings 140 include an inner ledge (not shown) to receive the bushing 190. During installation of the intercostal 100, after the bushing 190 and the fastener are inserted into the slip joint opening 140, the bushing 190 rigidly attaches to a top surface of a seat track 410 (refer to FIG. 4A) of the cabin of a vehicle (e.g. an aircraft) by the fastener. The installation of the intercostal 100 will be further described in the description of FIGS. 4A and 5.

Referring back to FIG. 1A, the intercostal 100 is also shown to include two static openings 150 located proximate the second end 130 of the body 110. The static openings 150 are each able to receive a fastener (e.g., an E-nut). During installation of the intercostal 100, after the fastener is inserted into the static opening 150, the fastener rigidly attaches the intercostal 100 to a top surface of a seat track 420, which is substantially parallel to seat track 410 (refer to FIG. 4A).

Also in FIG. 1A, the body 110 of the intercostal 100 is shown to include flanges 160 each having a top surface and a bottom surface. The flanges 160 extend substantially horizontally from a longitudinal side of the body 110. Each of the flanges 160 are shown to comprise an opening 165 to receive a floor panel connector (e.g., a fastener), which is used to mount a floor panel to the top surface of the flange 160. After the intercostal 100 is installed, the top surface of each the flanges 160 is substantially coplanar with the top surface of the seat tracks 410, 420 (refer to FIG. 4A).

In FIG. 1A, the top surface of the body 110 of the intercostal 100 is also shown to include a monument interface 170. Additionally, the top surface of the second end 130 of the body 110 of the intercostal 100 includes a monument interface 175. The monument interfaces 170, 175 each include openings 180, 185 to receive fasteners, which are used to mount various different structures (e.g., furniture, a class divider wall, a galley, and/or equipment) to the monument interfaces 170, 175.

Also in this figure, two optional additional static openings 188 are shown on the body 110 of the intercostal 100. The static openings 188 are each able to receive a fastener (e.g., an E-nut). During installation of the intercostal 100, after the fastener is inserted into the static opening 188, the fastener rigidly attaches the intercostal 100 to a top surface of a supporting track 430, which is substantially parallel to seat track 410 and to seat track 420 (refer to FIG. 4A).

FIG. 1B is a diagram of an exemplary bushing 190 to be employed by the modular replaceable slip joint intercostal 100 of FIG. 1, in accordance with at least one embodiment of the present disclosure. FIG. 1C is a diagram showing the bottom view of the exemplary bushing 190 of FIG. 1B, in accordance with at least one embodiment of the present disclosure. In these figures, two portions 195 of the body 194 of the bushing 190 are shown to be substantially cylindrical in shape. And, two other portions 196 of the body 194 of the bushing 190 are shown to have a flat surface, which is where the bushing 190 contacts the intercostal 100 and which allows for an easier application of a low friction material (e.g., a polymer) to provide for a low-friction slip joint 140. In addition, the bushing 190 is shown to include a flange 198 on one of its ends. The flange 198 is shown to have two portions 197 that have a flat surface. After the intercostal 100 is installed, the underside of the flange 198 is in contact with the inner ledge of the slip joint 140. The flange 198 serves primarily to retain the intercostal 100.

In one or more embodiments, the underside of the flange 198 of the bushing 190 is coated with a material (e.g., a polymer) to reduce friction. In at least one embodiment, the inner ledge of the slip joint 140 is also coated with a material to reduce friction. In some embodiments, at least a portion of the exterior surface of the body 194 of the bushing 190 is coated with a material to reduce friction. In one or more embodiments, at least a portion of the interior surface of the slip joint 140 is coated with a material to reduce friction. In yet another embodiment, the underside of the first end 120 and the second end 130 of the intercostal 100 is coated with a material to reduce friction. An example of a material that may be employed for the coating is Karon V, which is manufactured by Kaman Corp. However, it should be noted that other materials other than Karon V may be employed for the coating.

Figure 2:
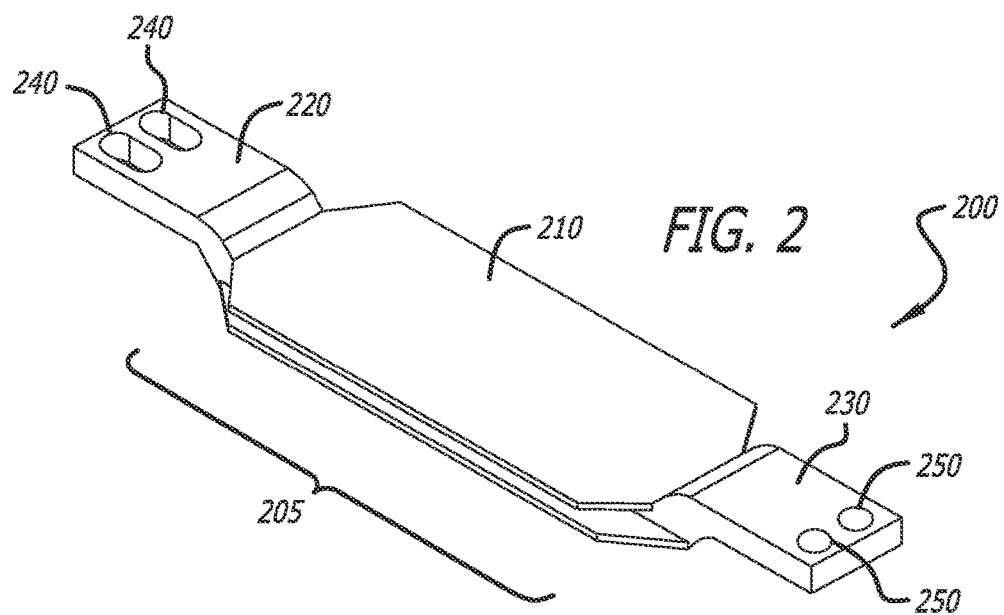
FIG. 2 is diagram of a second embodiment of the disclosed modular replaceable slip joint intercostal, in accordance with at least one embodiment of the present disclosure.

FIG. 2 is diagram of a second embodiment of the disclosed modular replaceable slip joint intercostal 200, in accordance with at least one embodiment of the present disclosure. In this figure, the intercostal 200 is shown to be multi-planar such that the top surface of the center section 205 of the body 210 is lower than the top surface of the first end 220 of the body 210 and the top surface of the second end 230 of the body 210. The top surface of the first end 220 of the body 210 and the top surface of the second end 230 of the body 210 are substantially co-planar and substantially co-planar with the top surface of an adjacent floor panel (not shown).

Also in this figure, the intercostal 200 is shown to include two slip joint openings (i.e. slip joints) 240 located proximate the first end 220 of the body 210. The slip joint openings 240 are each able to slidably receive a bushing 190 (refer to FIG. 1B) and a fastener (not shown). During installation of the intercostal 200, after the bushing 190 and the fastener are inserted into the slip joint opening 240, the bushing 190 rigidly attaches to a top surface of a seat track of the cabin of a vehicle (e.g. an aircraft) by the fastener.

Also in FIG. 2, the intercostal 200 is shown to include two static openings 250 located proximate the second end 230 of the body 210. The static openings 250 are each able to receive a fastener (e.g., an E-nut). During installation of the intercostal 200, after the fastener is inserted into the static opening 250, the fastener rigidly attaches the intercostal 200 to a top surface of a seat track.

In one or more embodiments, the intercostal 200 is modular such that the center section 205 of the body 210 is a single part (e.g., manufactured to be a single, separate unit), the first end 220 of the body 210 is a single part, and the second end 230 of the body 210 is a single part. And, the center section 205, the first end 220, and the second end 230 are mechanically fastened (e.g., via bolts, bonding, welding, etc.) together to form the intercostal 200.

Figure 3:
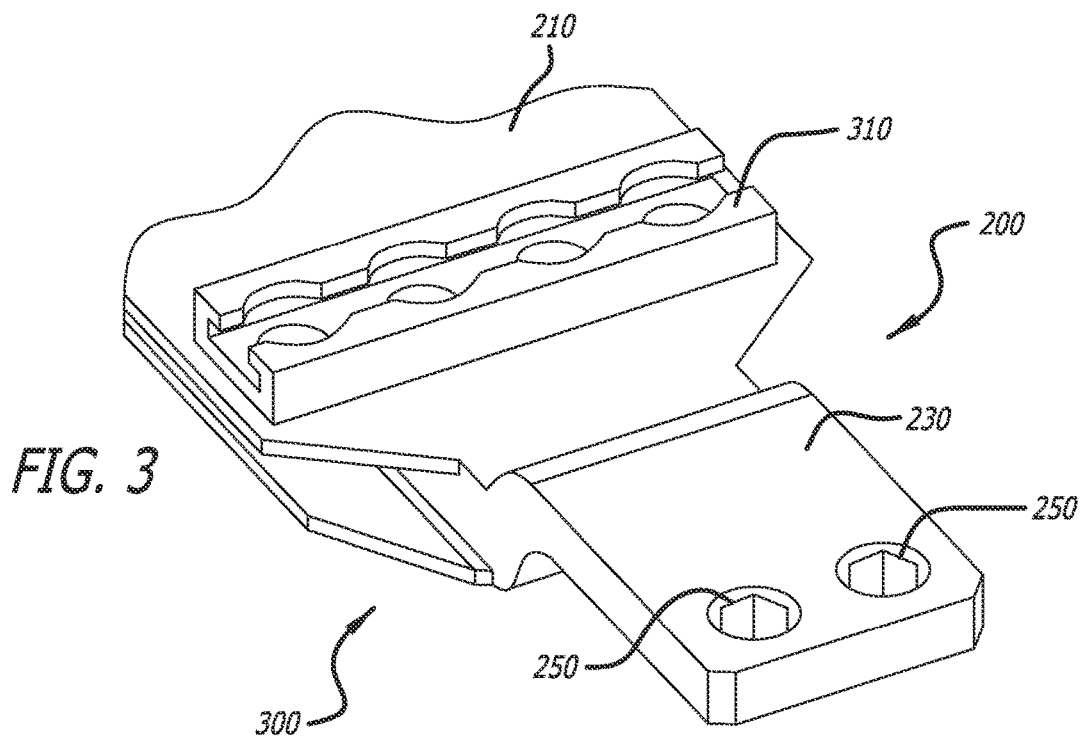
FIG. 3 is a diagram of a crown-type seat track mounting that may be employed by the modular replaceable slip joint intercostal of FIG. 1 and/or by the modular replaceable slip joint intercostal of FIG. 2, in accordance with at least one embodiment of the present disclosure.

FIG. 3 is a diagram of a crown-type seat track mounting 310 that may be employed by the modular replaceable slip joint intercostal 100 of FIG. 1 and/or by the modular replaceable slip joint intercostal 200 of FIG. 2, in accordance with at least one embodiment of the present disclosure. In this figure, the intercostal 200 of FIG. 2 is shown to include this crown-type seat track mounting 310 on its body 210. This particular mounting 310 is a traditional mounting that is commonly used to install seats in a cabin of an aircraft.

Figure 4A:
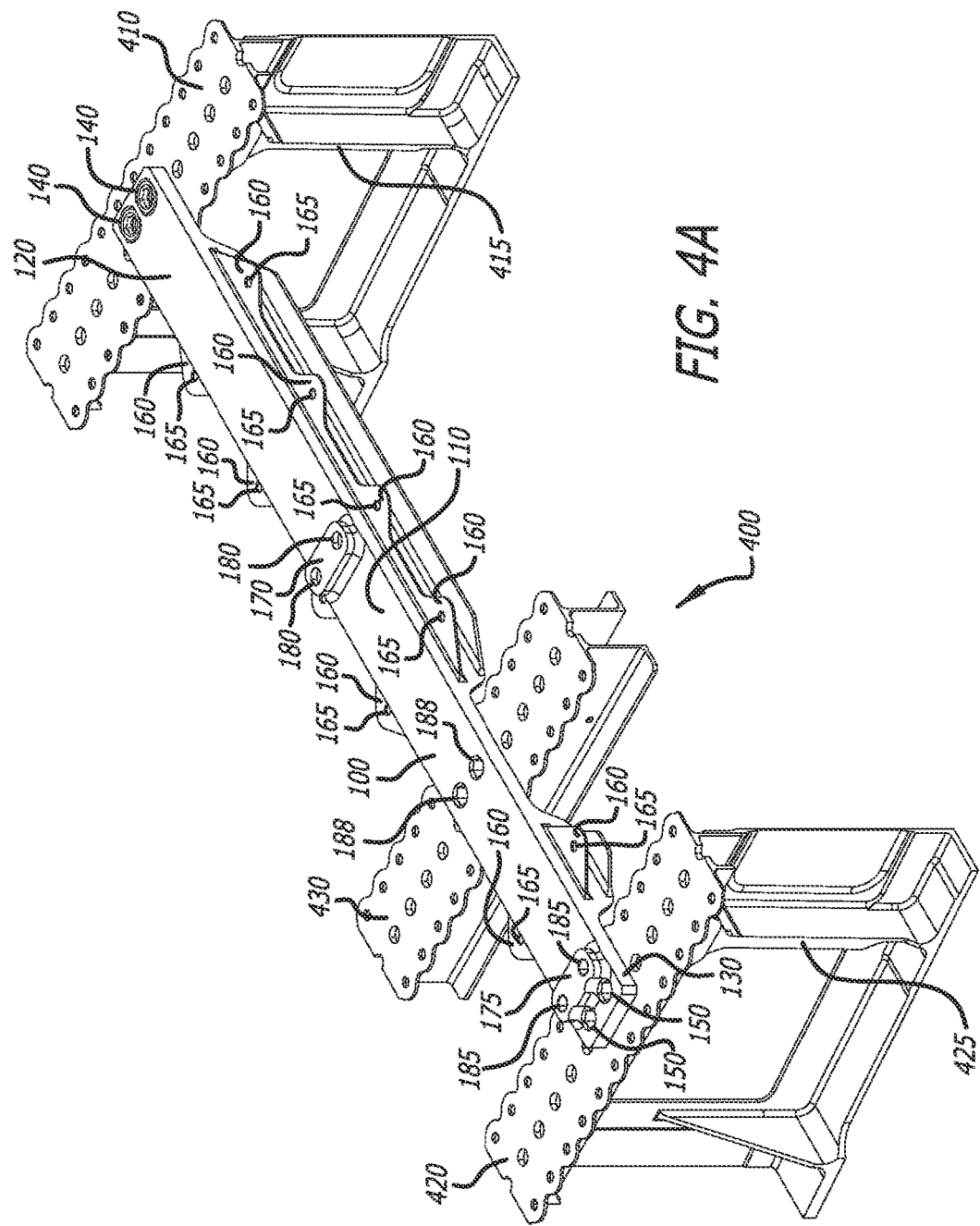
FIG. 4A is a diagram of the modular replaceable slip joint intercostal of FIG. 1 installed between two seat tracks of a vehicle, in accordance with at least one embodiment of the present disclosure.

FIG. 4A is a diagram 400 of the modular replaceable slip joint intercostal 100 of FIG. 1 installed atop two seat tracks 410, 420 of a vehicle, in accordance with at least one embodiment of the present disclosure. In this figure, the intercostal 100 is shown to be mounted onto two seat tracks 410, 420 as well as a supporting track 430. In addition, the figure shows each seat track 410, 420 located above a respective longitudinal beam 415, 425.

As previously mentioned above, during installation of the intercostal 100, two slip joint openings (i.e. slip joints) 140, located proximate the first end 120 of the body 110, slidably receive a bushing 190 (refer to FIG. 1B) and a fastener (not shown). After the bushing 190 and the fastener are inserted into the slip joint opening 140, the bushing 190 rigidly attaches to a top surface of seat track 410 by the fastener.

In addition, during installation of the intercostal 100, two static openings 150, located proximate the second end 130 of the body 110, receive a fastener (e.g., an E-nut). After the fastener is inserted into the static opening 150, the fastener rigidly attaches the intercostal 100 to a top surface of seat track 420.

Also during installation of the intercostal 100, the openings 165 of flanges 160 each receive a floor panel connector (e.g., a fastener), which is used to mount a floor panel(s) (not shown) to the top surface of the flange 160. After the intercostal 100 is installed, the top surface of each of the flanges 160 is substantially coplanar with the top surface of the seat tracks 410, 420.

In addition, during installation of the intercostal 100, the openings 180, 185 of the monument interfaces 170, 175 receive fasteners, which are used to mount various different payloads (e.g., furniture, a class divider wall, a galley, and/or equipment) to the intercostal 100.

Additionally during installation of the intercostal 100, the optional static openings 188 may each receive a fastener (e.g., an E-nut). After the fastener is inserted into the static opening 188, the fastener rigidly attaches the intercostal 100 to a top surface of supporting track 430, which is substantially parallel to seat track 410 and to seat track 420.

FIG. 4B is side view 440 of the diagram of FIG. 4A, in accordance with at least one embodiment of the present disclosure. FIG. 4C is cut-away view 450 of the side view 440 of FIG. 4B, in accordance with at least one embodiment of the present disclosure.

Figure 5:
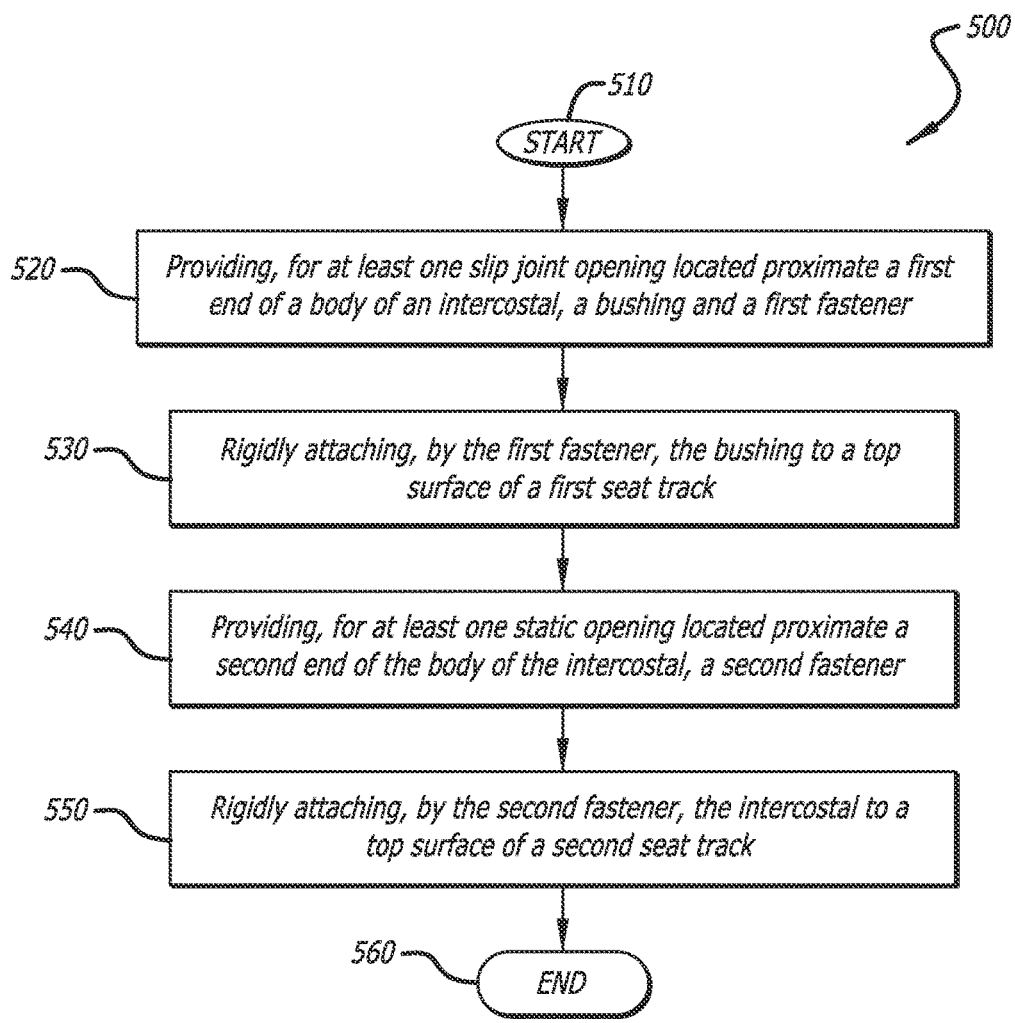
FIG. 5 is a flow chart for the disclosed method for installing an intercostal in a vehicle, in accordance with at least one embodiment of the present disclosure.

FIG. 5 is a flow chart for the disclosed method 500 for installing an intercostal 100, 200 in a vehicle, in accordance with at least one embodiment of the present disclosure. At the start 510 of the method 500, a bushing and a first fastener are provided for at least one slip joint opening located proximate a first end of a body of the intercostal 520. Then, the first fastener rigidly attaches the bushing to a top surface of a first seat track 530. A second fastener is provided for at least one static opening located proximate a second end of the body of the intercostal 540. The second fastener then rigidly attaches the intercostal to a top surface of a second seat track 550. Then, the method 500 ends 560.

Figure 6:
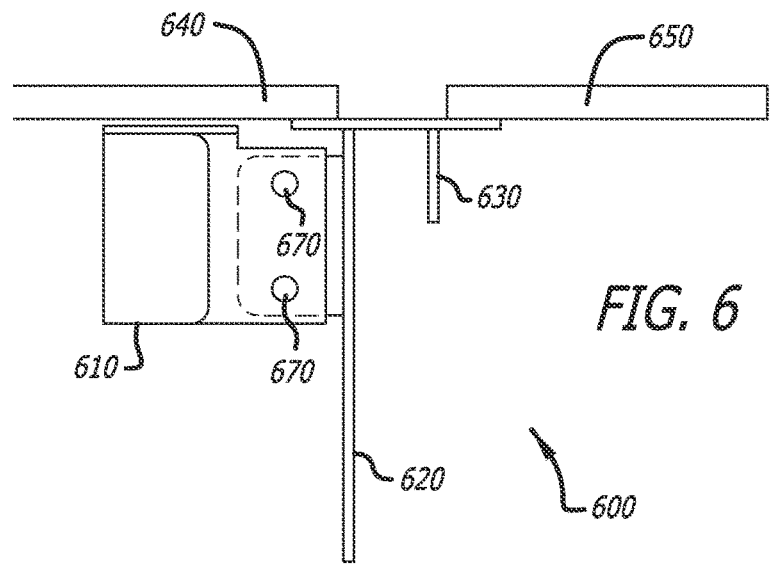
FIG. 6 is a diagram showing a cut-away side view of a conventional intercostal installed in a vehicle.

FIG. 6 is a diagram 600 showing a cut-away side view of a conventional intercostal 610 installed in a vehicle. In this figure, a conventional intercostal 610 is shown to be mounted onto a longitudinal beam 620. The conventional intercostal 610 is rigidly attached to the longitudinal beam 620 by fasteners 670.

The conventional intercostal 610 is also shown to be installed underneath a seat track 630 and a floor panel 640. The seat track 630 is shown to be located beneath two floor panels 640, 650. With this conventional intercostal design, installation work must occur below the surface of the floor panels 640, 650 and the web portion of the longitudinal beam 620 must be modified to accommodate the conventional intercostal. Moreover, this area is extremely tight to work in and, in many cases, it is difficult or impossible to install the conventional intercostal 610 (e.g., to fit the necessary tools, etc.) in this space without temporarily, or permanently, removing or modifying local systems and associated structures (e.g., adjacent floor panels 640, 650).

Figure 7:
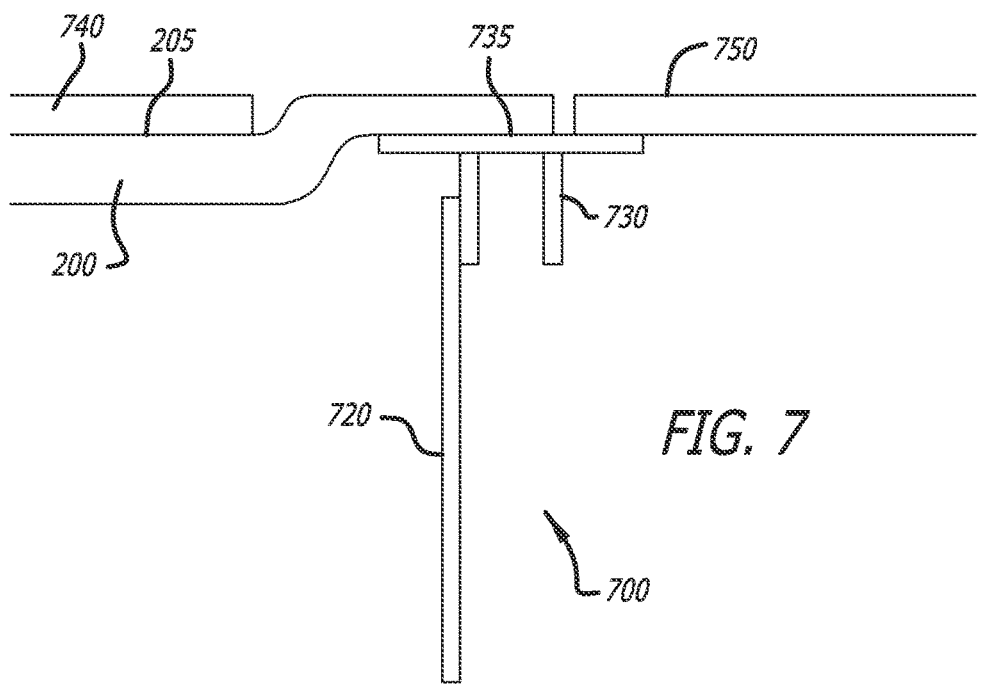
FIG. 7 is a diagram depicting a cut-away side view of the disclosed modular replaceable slip joint intercostal of FIG. 2 installed in a vehicle, in accordance with at least one embodiment of the present disclosure.

FIG. 7 is a diagram 700 depicting a cut-away side view of the disclosed modular replaceable slip joint intercostal 200 of FIG. 2 installed in a vehicle, in accordance with at least one embodiment of the present disclosure. In this figure, an intercostal 200 is shown to be mounted atop seat track 730, which is connected to a longitudinal beam 720. The intercostal 200 is rigidly attached to the seat track 730 by fasteners and, optionally, bushings. It should be noted that the top surface of the center section 205 of the intercostal 200 is substantially at the same height as the top surface 735 of the seat track 730 to mimic a flat-topped seat track interface.

The intercostal 200 is shown to be installed underneath a floor panel 740. And, the seat track 730 is shown to be located beneath a floor panel 750. With this disclosed design, installation work may occur above (i.e. no tooling is required from below) the surface of the floor panels 740, 750 because of the multi-planar design of the intercostal 200. This is very beneficial because local systems, adjacent floor panels 740, 750, and/or structures (e.g., seats) mounted above the floor panels 740, 750 do not need to be removed for the installation process.

Figure 8:
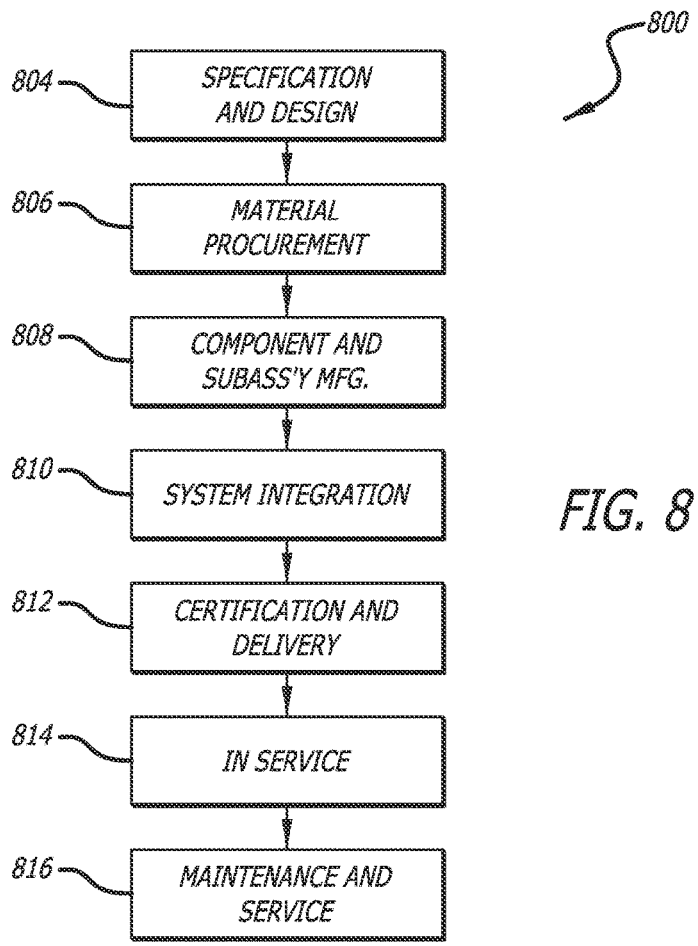
FIG. 8 is a flow diagram of aircraft production and service methodology, in accordance with at least one embodiment of the present disclosure.
Figure 9:
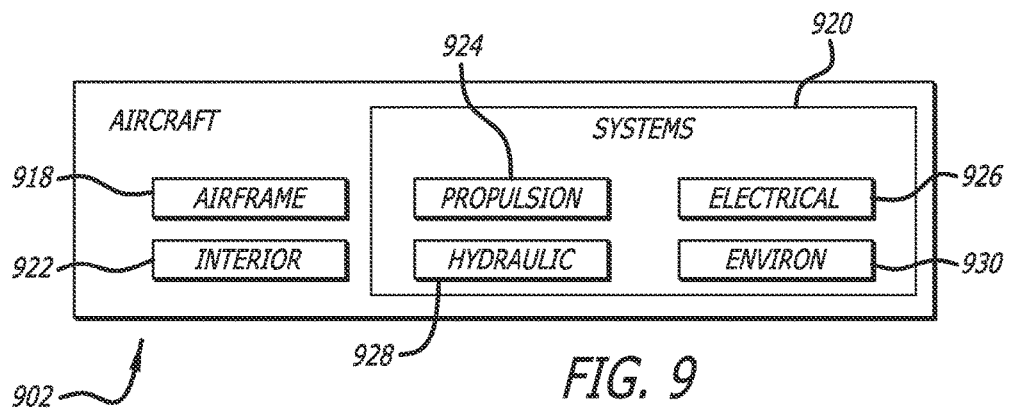
FIG. 9 is a block diagram of an aircraft, in accordance with at least one embodiment of the present disclosure.

Examples of the disclosure may be described in the context of an aircraft manufacturing and service method 800 as shown in FIG. 8 and an aircraft 902 as shown in FIG. 9. During pre-production, exemplary method 800 may include specification and design 804 of the aircraft 902 and material procurement 806. During production, component and subassembly manufacturing 808 and system integration 810 of the aircraft take place. Thereafter, the aircraft 902 may go through certification and delivery 812 to be placed in service 814. While in service by a customer, the aircraft 902 is scheduled for routine maintenance and service 816 (which may also include modification, reconfiguration, refurbishment, and so on).

Each of the processes of the illustrative method 800 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, the aircraft 902 produced by the illustrative method 800 may include an airframe 918 with a plurality of high-level systems 920 and an interior 922. Examples of high-level systems 920 include one or more of a propulsion system 924, an electrical system 926, a hydraulic system 928, and an environmental system 930. Any number of other systems may be included. Although an aerospace example is shown, the principles of the disclosure may be applied to other industries, such as the automotive industry.

Apparatus and methods shown or described herein may be employed during any one or more of the stages of the manufacturing and service method 800. For example, components or subassemblies corresponding to component and subassembly manufacturing 808 may be fabricated or manufactured in a manner similar to components or subassemblies produced while the aircraft 902 is in service. Also, one or more aspects of the apparatus, method, or combination thereof may be utilized during the production states 808 and 810, for example, by substantially expediting assembly of or reducing the cost of an aircraft 902. Similarly, one or more of apparatus or method realizations, or a combination thereof, may be utilized, for example and without limitation, while the aircraft 902 is in service, e.g., maintenance and service 816.

It should be noted that the disclosed intercostal 100, 200 may be employed in cabins of other types of vehicles other than aircraft. In one or more embodiments, the disclosed intercostal may be employed in cabins of airborne vehicles (e.g., airplanes, space planes, and helicopters), terrestrial vehicles (e.g., trains, buses, and cars), and marine vehicles (e.g. boats and ships).

Where methods described above indicate certain events occurring in certain order, those of ordinary skill in the art having the benefit of this disclosure would recognize that the ordering may be modified and that such modifications are in accordance with the variations of the disclosure. Additionally, parts of methods may be performed concurrently in a parallel process when possible, as well as performed sequentially. In addition, more parts or less part of the methods may be performed.

Different examples and aspects of the systems, apparatus, and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings. Accordingly, embodiments are intended to exemplify alternatives, modifications, and equivalents that may fall within the scope of the claims.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

We claim:

1. An aircraft intercostal apparatus, the apparatus comprising:
    a body, wherein the body is greater in length than in width; and
    at least one slip joint opening located proximate a first end of the body to slidably receive a bushing and a first fastener, wherein the bushing rigidly attaches to a top surface of a first seat track by the first fastener.

2. The apparatus of claim 1, wherein the apparatus is installed in an over-wing area of the aircraft.

3. The apparatus of claim 1, wherein at least a portion of an exterior surface of the bushing is coated with a material to reduce friction.

4. The apparatus of claim 1, wherein at least a portion of an interior surface of the at least one slip joint is coated with a material to reduce friction.

5. The apparatus of claim 1, wherein the aircraft intercostal apparatus further comprises at least one static opening located proximate a second end of the body, which is opposite the first end of the body, to receive a second fastener to rigidly attach the apparatus to a top surface of a second seat track, which is substantially parallel to the first seat track.

6. The apparatus of claim 5, wherein the body comprises at least one flange having a top surface and a bottom surface, the at least one flange extending substantially horizontally from a longitudinal side of the body such that a top surface of the at least one flange is substantially coplanar with the top surface of the first seat track and the top surface of the second seat track, and the at least one flange comprises at least one opening to receive a floor panel connector.

7. The apparatus of claim 1, wherein the apparatus further comprises at least one monument interface on a top surface of the body of the apparatus.

8. The apparatus of claim 7, wherein the at least one monument interface is used to mount at least one of furniture, a class divider wall, a galley, and equipment.

9. The apparatus of claim 7, wherein the at least one monument interface is a crown-type seat track mounting.

10. The apparatus of claim 1, wherein a top surface of the body is multi-planar, such that a top surface of a center section of the body, located between the first end of the body and a second end of the body, is lower than a top surface of the first end of the body and a top surface of the second end of the body, which are substantially co-planar, and
    wherein the second end of the body is opposite the first end of the body.

11. The apparatus of claim 10, wherein the center section of the body is a single part, the first end of the body is a single part, and the second end of the body is a single part; and
    wherein the center section, the first end, and the second end are mechanically fastened together to form the apparatus.

12. The apparatus of claim 1, wherein at least a portion of the bushing is substantially cylindrical in shape.

13. The apparatus of claim 12, wherein a top edge of the bushing comprises a flange.

14. The apparatus of claim 13, wherein an underside of the flange of the bushing is in contact with an inner ledge of the at least one slip joint, when the at least one slip joint receives the bushing.

15. The apparatus of claim 14, wherein the underside of the flange of the bushing is coated with a material to reduce friction.

16. The apparatus of claim 14, wherein the inner ledge of the at least one slip joint is coated with a material to reduce friction.

17. A method for installing an aircraft intercostal, the method comprising:
    providing, for at least one slip joint opening located proximate a first end of a body of the intercostal, a bushing and a first fastener,
    wherein an underside of a flange of the bushing is in contact with an inner ledge of the at least one slip joint opening; and
    rigidly attaching, by the first fastener, the bushing to a top surface of a first seat track.

18. The method of claim 17, wherein the method further comprises:
    providing, for at least one static opening located proximate a second end of the body, a second fastener,
    wherein the first end of the body is opposite the second end of the body; and rigidly attaching, by the second fastener, the intercostal to a top surface of a second seat track, which is substantially parallel to the first seat track.

19. The method of claim 18, wherein the method further comprises:
    providing, for at least one opening of at least one flange extending substantially horizontally from a longitudinal side of the body such that a top surface of the at least one flange is substantially coplanar with the top surface of the first seat track and the top surface of the second seat track, a floor panel connector; and
    rigidly attaching, with the floor panel connector, the intercostal to a bottom surface of a floor panel.

20. An aircraft system for an intercostal, the system comprising:
    at least one first fastener;
    at least one bushing; and
    the intercostal comprising:
    a body, wherein the body is greater in length than in width, and
    at least one slip joint opening located proximate an end of the body to slidably receive the at least one bushing and the at least one first fastener, wherein the at least one bushing rigidly attaches to a top surface of a seat track by the at least one first fastener.

* * * * *